Nov. 24, 1970     D. LEJEUNE     3,541,644
DEVICE FOR VULCANIZING REPAIRS IN DAMAGED TIRES
Filed Oct. 5, 1967     2 Sheets-Sheet 1
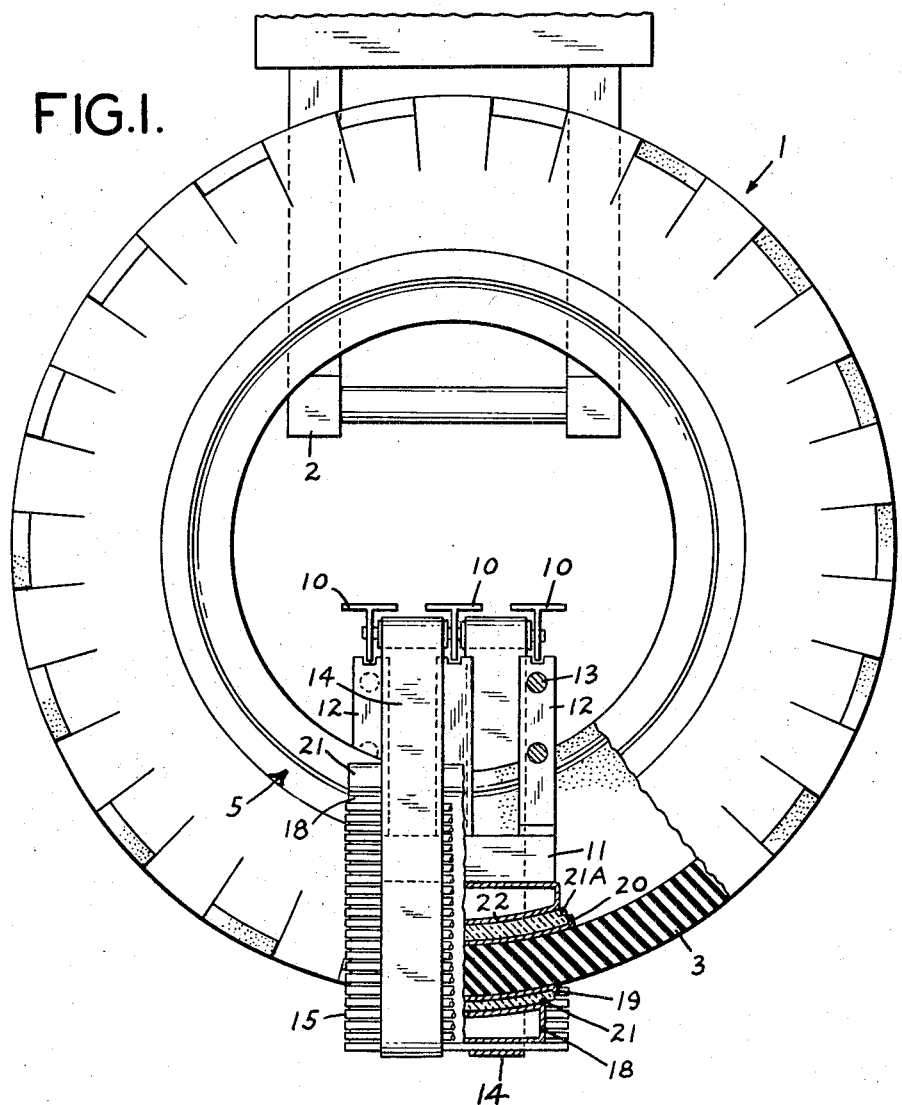
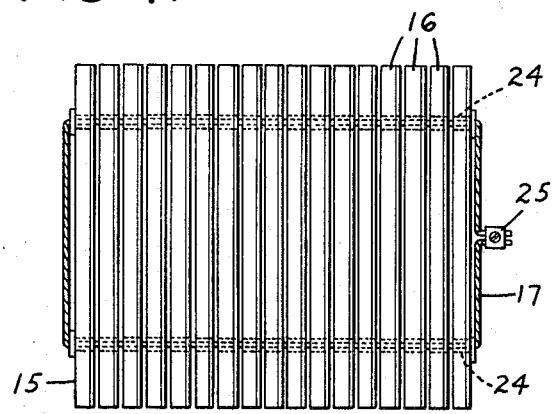
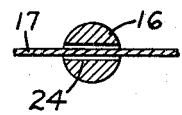
INVENTOR
DANIEL LEJEUNE
BY
HIS ATTORNEYS

United States Patent Office 3,541,644
Patented Nov. 24, 1970

3,541,644
DEVICE FOR VULCANIZING REPAIRS IN DAMAGED TIRES
Daniel Lejeune, Clermont-Ferrand, France, assignor to Compagnie Generale des Etablissements Michelin, raison sociale Michelin & Cie, Clermont-Ferrand, Puy-de-Dom, France
Filed Oct. 5, 1967, Ser. No. 673,113
Claims priority, application France, Oct. 21, 1966, 81,214
Int. Cl. B29h 5/02
U.S. Cl. 18—18                                4 Claims

ABSTRACT OF THE DISCLOSURE

A device for vulcanizing repairs in a damaged tire which includes heating elements to be applied to the inner and outer surfaces of the tire in the repair area, inflatable pneumatic cushions inside and outside of the tire to apply pressure during vulcanization, insulating pads between the heating elements and the cushions, an articulated mat supporting the pneumatic cushion on the outside of the tire, a form supporting the cushion inside of the tire and tensioning elements extending around the outside of the mat and connected to the form to enable the pneumatic cushions to apply uniform high pressure to the repaired area when the cushions are inflated.

---

This invention relates to a vulcanizing device for repairing tires, and more particularly to devices for repairing large tires such as those used on road-building machines and off highway vehicles.

It is generally recognized that hot vulcanization under pressure is required to make a strong, good quality repair on a tire or tire casing. Devices for hot vulcanizing under pressure are available but only for small-size tires or in repair shops where molds similar to those used in the manufacture of new tires are available. Strong, simple and light devices for hot vulcanizing under pressure have not been available for use in remote areas, such as construction sites for the repair of different models of tires of large size and damaged tires must be sent to a factory to obtain a repair of good quality.

The present invention relates to devices for vulcanizing tires under pressure which can be applied to a tire at a damaged area and includes heating elements and pressure applying means effective to hot vulcanize under pressure a patching material applied to the damaged area. More particularly a suitable vulcanizing device embodying the invention comprises:

(a) a frame formed by one or more cross bars which are placed inside the tire, parallel to its axis;

(b) an inner form supported by the frame and having approximately the shape of the inside surface of the tire in the zone to be repaired;

(c) one or more outside straps extending around the tire and being attached at their ends to the frame;

(d) an articulated mat composed of rigid elements placed between the tire and the straps so as to conform to the outside profile of the tire;

(e) pneumatic cushions placed on the inside of the tire between the form and the tire, and on the outside between the tire and the jointed mat; and (f) heating elements and thermal insulation placed directly against the tire, consisting, for example, of electric resistance heaters and insulating pads.

Instead of a core having the exact inside shape of the tire, the new vulcanizing device includes one or more forms consisting preferably of elements that can be disassembled and the shape of which only very roughly or approximately conforms to the interior of the tire. With relatively few forms, it is possible to repair tires of widely different dimensions and/or sectional shapes. These forms can be made sufficiently stiff and strong without excessive weight to withstand stresses of several tons which are necessary for satisfactory hot vulcanizing.

The straps also must be able to withstand high stresses and suitably may be comprised of rubber reinforced with metal cords of the kind used in tire reinforcements.

The articulated mat may advantageously consist of metal bars or rods, preferably of circular cross section which are connected with one another by means of cables threaded through holes extending through the bars. Mats of the type described play an essential part in equalizing the tension of the straps among one another and within each strap in spite of the curvature of the tire, irregularities of shape due to the tread pattern, variation in curvature and the like. Experience shows that without a tension-equalizing mat, the straps break easily.

Pneumatic cushions are provided both inside and outside of the tire. Their function is to compensate for the clearance or play between the form or the straps and the tire, as well as to exert pressure on the surface of the tire. A much more regular distribution of the pressure on the cover is obtained with the pneumatic cushions than is obtained, for example, with a rubber layer of any reasonable or usable thickness. Furthermore, the use of pneumatic cushions on the inside and on the outside of the tire cover makes it possible to give the repaired area its normal shape during vulcanization, which is especially important when a damaged sidewall is being repaired. By proper sequential inflation of the cushions, the beads can be moved closer together or further apart to provide the correct spacing between the beads.

The cushions are made of rubberized fabric or rubberized plies of textile or metal cords and are provided with suitable inflating valves.

For a better understanding of the invention reference may be had to the attached drawings wherein:

FIG. 1 is a front view, elevational and partially in longitudinal section, of a tire equipped with a vulcanizing device embodying the invention;

FIG. 4 is a plan view of the jointed mat, and

FIG. 5 is a view in cross section of one of the bars forming the jointed mat.

Figure 2:
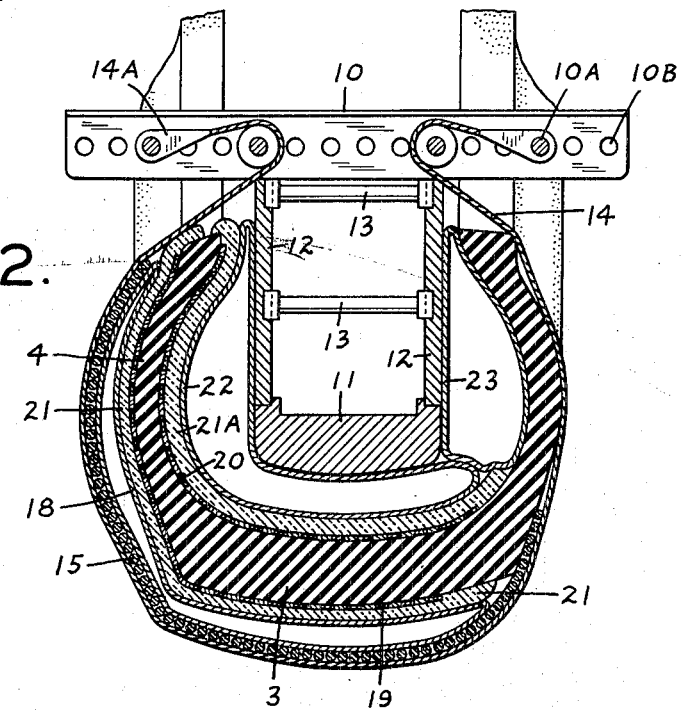
FIG. 2 is a cross sectional view on a larger scale than in FIG. 1 of the tire and the device according to FIG. 1 in which the repair zone is in the tread and one sidewall of the tire.

Referring to FIGS. 1 and 2, two horizontal and rigid cross pieces 2 forming part of a supporting frame (not shown) support a tire in a generally vertical position. The damaged portion of the tire to be patched and vulcanized, in this case a section of the tread 3 and the sidewall 4, is positioned within a vulcanizing device 5 embodying the invention including a frame composed of three cross pieces 10 having a T-shaped cross section and detachably connected to each other by means of shafts 10A extending through the holes 10B in the webs of the cross pieces. An inner form 11 is supported on the cross pieces 10 by means of lateral plates or bars 12 braced by means of tie rods 13. Straps 14 are stretched around the outside of the tire and detachably connected to a pair of the shafts 10A by means of the eye loops 14A at the opposite ends of the straps. The straps may be cable or cord reinforced rubber or the like.

An articulated mat 15 is supported by the straps 14 outside the tread 3 and sidewalls of the tire. The mat 15 is composed of a plurality of parallel rods 16 connected by means of a metal cable 17 extending diametrically through the rods adjacent to their opposite ends.

A pneumatic cushion or air bag 18 composed of reinforced rubber or other suitable elastomer is supported by the mat 15. Two heating elements 19 and 20 each consisting of an electric resistance are applied, respectively against the inner wall of the tire and are covered by heat insulating elements such as asbestos pads 21 and 21A. The pad 21 and heating element 19 are supported by the air bag 18 and mat 15. Pneumatic cushions or air bags 22 and 23 are placed between the form 11 and the inner wall of the tire and the asbestos pad 21A is placed between the heating element 20 and the bags 22 and 23 wherever the said inner wall is covered by a heating element 20.

FIGS. 4 and 5 show that the bars 16 forming the jointed mat 15 are assembled by means of a metal cable 17 threaded through holes 24 which pass diametrically through each bar near its ends. After assembly of the required number of bars, the ends of the metal cable 17 are joined with each other, for example, by means of a threaded connector 25.

Figure 3:
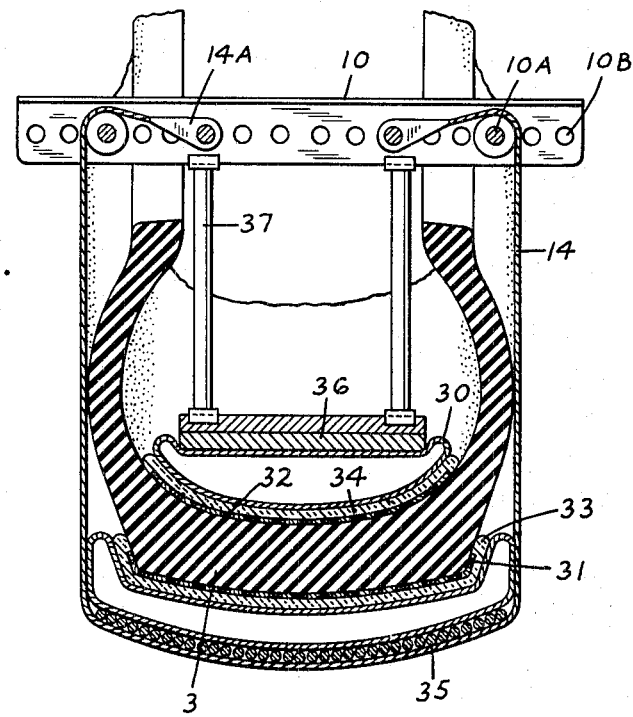
FIG. 3 is across sectional view similar to FIG. 2 but in which only the tread of the tire is being repaired.

The modification of the vulcanizing device illustrated in FIG. 3 differs from the device disclosed in FIGS. 1 and 2 primarily in its use to repair a damaged area in tread 3. The device comprises the same elements as in the preceding example, except, however, that only one pneumatic cushion 30 is required inside the tire, and the electric resistances 31 and 32, the asbestos pads 33 and 34 and the jointed mat 35 extend only along the tread and not along the sidewall. In this case, the form 36 is supported on the cross pieces 10 by means of the rods 37 which are not braced transversely inasmuch as this form is not subject to transversely directed stresses.

The various elements of the vulcanizing device are assembled in the damaged area of the tire by first assembling the heating pad, air bag or bags and the form in the interior of the tire and then assembling the exterior heating elements, insulating pads, air bags, mats and straps around the outside of the tire. The various elements may be retained temporarily in assembled positions by means of adhesive tape. When all elements are in place the pneumatic cushions or air bags are inflated to the desired pressure and the heaters are energized to vulcanize the repair material.

When the pressures applied for vulcanization of the repair are not very high, the outside strap or straps and the articulated mat can be replaced by a laced corset made of rubberized fabric or rubber reinforced by wires or cords which are preferably metallic and arranged longitudinally or on a bias. Also the rigid inner form and the frame can be replaced by one or more pneumatic cushions or air bags which, when inflated, practically fully fill the interior section of the tire cover in the zone of the repair.

Other variations of the device are possible within the scope of the invention as defined in the following claims.

What is claimed is:

1. A vulcanizing device for repairing tires comprising heating elements to be positioned inside and outside the tire at an area to be vulcanized, inflatable cushions inside and outside said tire and overlying said heating elements, insulating means interposed between said heating elements and said cushions and flexible means extending around said tire for confining the cushion overlying the heating elements outside said tire against outward expansion to enable pressure to be applied to the area when said cushions are inflated, said flexible means comprising articulated means formed of a plurality of substantially rigid rod means and flexible tensioning means operatively associated with said mat means, each of said rod means extending generally longitudinally and said tensioning means extending generally crosswise of said tire, so that said flexible means is substantially rigid generally longitudinally and flexible generally crosswise of said tire.

2. The vulcanizing device set forth in claim 1 comprising a rigid form to be disposed in said tire and supporting the cushion in said tire against inward expansion when inflated.

3. The vulcanizing device set forth in claim 2 comprising a frame mounted in spaced-apart relation to said tire and supporting said form and in which said flexible tensioning means is connected at its ends to said frame and extends around the outside of said tire.

4. The device set forth in claim 2 comprising a frame supporting said form, said frame and form being composed of a plurality of readily disassembled parts and said tire being of a large size adapted for use on off-highway vehicles and road-building machines.

References Cited

UNITED STATES PATENTS

| | | | |
|---|---|---|---|
| 1,718,485 | 6/1929 | O'Sullivan | 18—18 |
| 2,421,100 | 5/1947 | Lakso | 18—18 |
| 2,801,443 | 8/1957 | Duerksen | 18—18 |
| 2,814,073 | 11/1957 | Van Scoyk | 18—18 |
| 3,172,158 | 3/1965 | Herman et al. | 18—18 |
| 3,261,240 | 7/1966 | Herman et al. | 18—18 X |
| 3,052,921 | 9/1962 | Robinson | 18—18 |
| 3,327,351 | 6/1967 | Alin | 18—18 |
| 3,434,183 | 3/1969 | Kaenan | 18—18 X |

J. HOWARD FLINT, Jr., Primary Examiner